(12) United States Patent
Newton

(10) Patent No.: US 12,166,840 B2
(45) Date of Patent: *Dec. 10, 2024

(54) CONFIGURABLE ACCESS-BASED CACHE POLICY CONTROL

(71) Applicant: NETFLIX, INC., Los Gatos, CA (US)

(72) Inventor: Christopher Newton, North Richland Hills, TX (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,364

(22) Filed: Jul. 19, 2023

(65) Prior Publication Data

US 2023/0362274 A1 Nov. 9, 2023

Related U.S. Application Data

(63) Continuation of application No. 17/023,261, filed on Sep. 16, 2020, now Pat. No. 11,711,445.

(30) Foreign Application Priority Data

May 20, 2023 (CN) .......................... 202310573393.4

(51) Int. Cl.
*H04L 67/568* (2022.01)
*H04L 67/1001* (2022.01)
*H04L 69/22* (2022.01)
*H04L 69/329* (2022.01)

(52) U.S. Cl.
CPC ........ *H04L 67/568* (2022.05); *H04L 67/1001* (2022.05); *H04L 69/22* (2013.01); *H04L 69/329* (2013.01)

(58) Field of Classification Search
CPC ... H04L 67/568; H04L 67/1001; H04L 69/22; H04L 69/329
See application file for complete search history.

(56) References Cited

U.S. PATENT DOCUMENTS

| 8,271,610 B2 | 9/2012 | Cao et al. |
| 8,626,876 B1 | 1/2014 | Kokal et al. |
| 8,949,368 B2 | 2/2015 | Koopmans et al. |
| 9,621,588 B2 | 4/2017 | Chan et al. |
| 2002/0049841 A1 | 4/2002 | Johnson et al. |

(Continued)

OTHER PUBLICATIONS

Contavalli et al., "Client Subnet in DNS Queries", Internet Engineering Task Force, Request for Comments: 7871, May 2016, pp. 1-30.

*Primary Examiner* — El Hadji M Sall
(74) *Attorney, Agent, or Firm* — Artegis Law Group, LLP

(57) ABSTRACT

Various embodiments of the present disclosure relate to a computer-implemented method of receiving a header associated with an object, where the header includes a limit value that specifies a quantity of times the object is to be served from a cache device before revalidation, and a current count value that specifies a number of times that the object has been served since a most-recent revalidation or load, receiving a request for the object from a requesting device, and upon determining that the current count value is below the limit value, serving the object to the requesting device from the cache device, or upon determining that the current count value matches the limit value, transmitting a request for revalidating the object.

20 Claims, 10 Drawing Sheets

(56) References Cited

U.S. PATENT DOCUMENTS

| | | |
|---|---|---|
| 2002/0143892 A1 | 10/2002 | Mogul |
| 2005/0033926 A1 | 2/2005 | Dumont |
| 2005/0102427 A1 | 5/2005 | Yokota et al. |
| 2008/0178238 A1 | 7/2008 | Khedouri et al. |
| 2008/0229021 A1 | 9/2008 | Plamondon |
| 2008/0229023 A1 | 9/2008 | Plamondon |
| 2010/0131659 A1 | 5/2010 | Narayana et al. |
| 2010/0281112 A1 | 11/2010 | Plamondon |
| 2011/0082916 A1 | 4/2011 | Swanson et al. |
| 2011/0099262 A1 | 4/2011 | Wang |
| 2012/0117141 A1 | 5/2012 | Beaver et al. |
| 2012/0311091 A1 | 12/2012 | Dingler et al. |
| 2013/0111057 A1 | 5/2013 | Yoon et al. |
| 2013/0144994 A1 | 6/2013 | Li et al. |
| 2014/0040417 A1 | 2/2014 | Gladwin et al. |
| 2014/0115124 A1 | 4/2014 | Xu |
| 2014/0188976 A1 | 7/2014 | Plamondon |
| 2014/0223002 A1 | 8/2014 | Varney et al. |
| 2014/0280187 A1* | 9/2014 | Molaro ................ G06F 16/278 707/741 |
| 2015/0188974 A1 | 7/2015 | Garcia-Mendoza Sanchez et al. |
| 2016/0126958 A1* | 5/2016 | Park ...................... H03K 21/38 377/55 |
| 2020/0133871 A1 | 4/2020 | Jia et al. |
| 2022/0086253 A1* | 3/2022 | Newton .............. H04L 67/1001 |

* cited by examiner

CONFIGURABLE ACCESS-BASED CACHE POLICY CONTROL

CROSS-REFERENCE TO RELATED APPLICATIONS

This application is a continuation of the co-pending U.S. patent application titled, "CONFIGURABLE ACCESS-BASED CACHE POLICY CONTROL," filed on Sep. 16, 2020, and having Ser. No. 17/023,261. The subject matter of this related application is hereby incorporated herein by reference.

BACKGROUND

Field

Embodiments of the present disclosure relate generally to distributed computing systems and, more specifically, to a configurable access-based cache policy control.

Description of the Related Art

Distributed computing systems include many different hardware and software components that operate to provide a variety of services to clients of the distributed computing systems. For example, a distributed computing system executing a video streaming service could provide access to a library of media titles that can be viewed on a range of different client devices. The distributed computing system offers clients access to the media library, where a client requests a particular media item (e.g., film, television episode, music video, etc.) and the content provider transmits the media item to the client device. Conventional content streaming services enhance streaming performance by storing digital content related to media items at various service endpoints and cache devices within a content delivery network (CDN). In such a manner, a given client device requests a particular media item and multiple service endpoints may serve the client device by providing the digital content (e.g., subtitles, metadata, authentication data, etc.) associated with playback of the media item. In some systems, a cache device may store the digital content in local storage and serve the digital content from local storage in lieu of requesting the digital content from an origin server.

One drawback with managing the delivery of content items from the CDN is that delivering locally-stored digital content from the cache devices may strain portions of the CDN. For example, the cache device may store a particular type of digital content, such as a smart container that contains a link directing the requesting device to a service endpoint. When this original endpoint becomes overloaded, the origin server may update the smart container with a different link that directs the requesting device to an endpoint different from the original service endpoint. However, the cache device does not transmit a request to update the smart container that is stored in local storage. As a result, the cache device serves the outdated smart container, steering the requesting device to the original service endpoint. Such techniques strain computing resources and network resources, as some service endpoints become overloaded with requests. Some CDNs attempt to address this issue by requiring that cache devices forward each request to an origin server, which processes each request in order to effectively load balance traffic to the individual service endpoints. However, such techniques reduce the efficiency of the CDN, as the origin server is required to receive and respond to each request made by multitudes of requesting devices.

As the foregoing illustrates, more effective techniques for managing traffic within the content delivery network are needed in the art.

SUMMARY

Various embodiments of the present disclosure relate to a computer-implemented method of receiving a header associated with an object, where the header includes a limit value that specifies a quantity of times the object is to be served from a cache device before revalidation, and a current count value that specifies a number of times that the object has been served since a most-recent revalidation, load, or re-load, receiving a request for the object from a requesting device, and upon determining that the current count value is below the limit value, serving the object to the requesting device from the cache device, or upon determining that the current count value matches the limit value, transmitting a request for revalidating the object.

Other embodiments include, without limitation, a computer system that performs one or more aspects of the disclosed techniques, as well as one or more non-transitory computer-readable storage media including instructions for performing one or more aspects of the disclosed techniques.

At least one technological advantage of the disclosed techniques relative to the prior art is that the content delivery network can manage the number of times edge devices serve digital content from local storage. In particular, by limiting the number of times that a given object can be served from the cache before requiring revalidation, the origin server can monitor the traffic that is steered to particular service endpoints without directly responding to requests for the digital content stored at the edge device. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
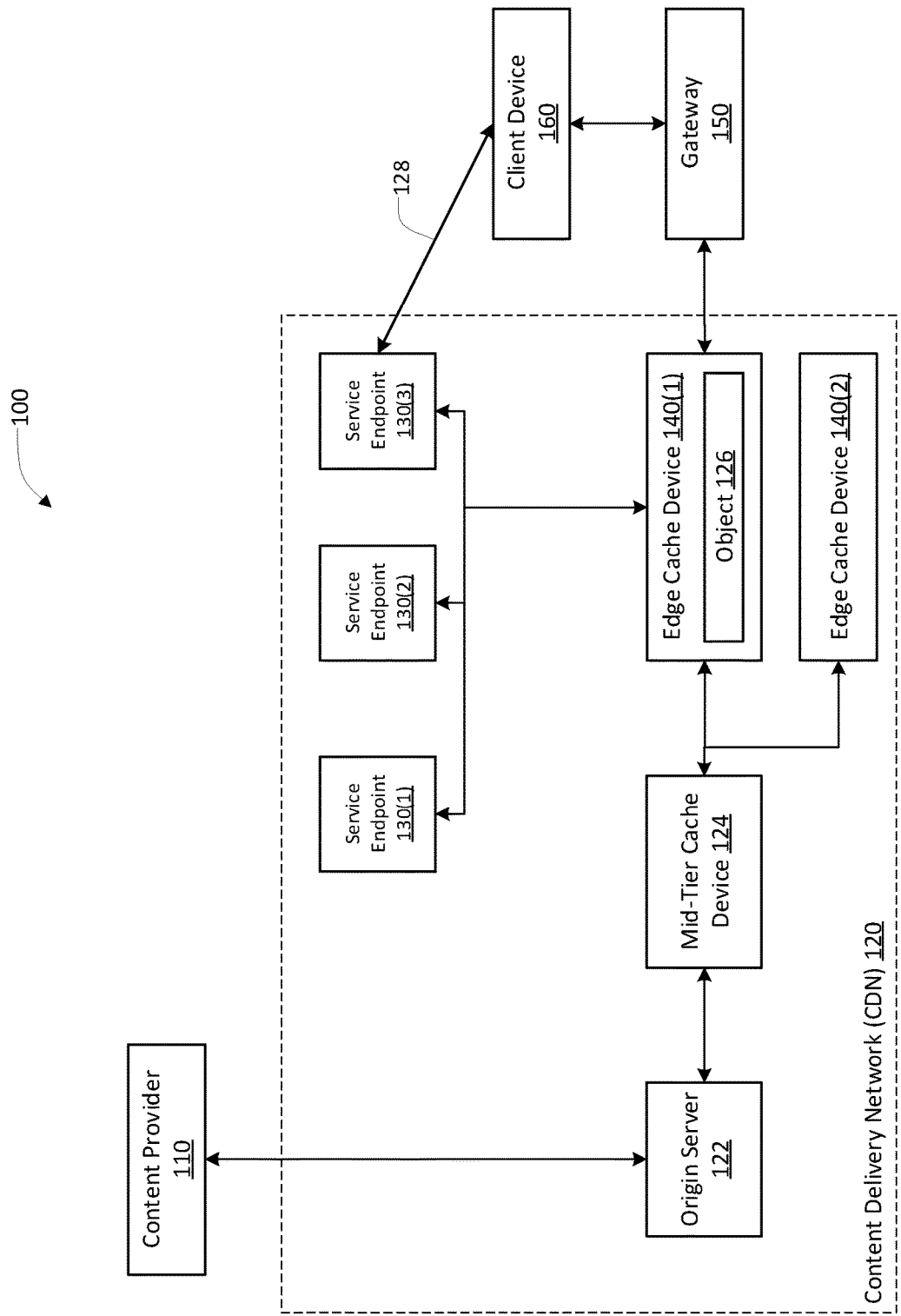
FIG. 1 illustrates a network infrastructure that is configured to implement one or more aspects of the present disclosure.

In the following description, numerous specific details are set forth to provide a more thorough understanding of the various embodiments. However, it will be apparent to one skilled in the art that the inventive concepts may be practiced without one or more of these specific details.

A video streaming service provides high-quality digital content to viewers. In certain instances, the video streaming service uses a content delivery network (CDN) to deliver digital content to a large number of client devices. When delivering digital content to a client device, the CDN may deliver digital content from multiple service endpoints, where a given service endpoint provides a portion of the digital content. For example, when responding to a request for a video for playback, a content server could serve portions of the video from multiple service endpoints, such as one service endpoint providing a video file, one service endpoint providing a subtitle file, and another service endpoint providing metadata. Various techniques to maintain the efficacy of the CDN regularly attempt to balance the load placed on the multiple service endpoints within the CDN by managing the volume of requests transmitted to each of the service endpoints.

Prior art techniques alleviated load placed on service endpoints by storing certain assets locally in cache devices and serving the file directly from the cache device instead of steering the request to the service endpoint. However, such techniques would have a cache device serve an outdated file without transmitting requests within the CDN that would otherwise cause the cache to receive an updated file. Other techniques would require the cache device to forward each request to the origin server in order for the origin server to ensure that the file is the current version, as well as enabling the origin server to perform load balancing of traffic to particular service endpoints. However, such a requirement wastes resources by directing each request for a particular file to the origin server, requiring that each request received by the CDN traverse from an edge device in the CDN to the origin server, and each response traverse back through the CDN from the origin server to the edge device.

In contrast, the disclosed network and associated disclosed techniques enable devices within a CDN to manage the load placed on service endpoints by controlling digital content that steers requesting devices to particular service endpoints. In particular, an origin server configures the cache policy of a given object. The origin server generates one or more messages that are associated with an object. When providing a message to a cache device, the origin server includes the object in the message body and includes a header that has various parameters that specify how the cache device is to store the object in local storage. One parameter is a count-limit value that limits the maximum number of times that the cache device can serve the object to a requesting device before revalidation. The cache device may serve the object from local storage to requesting devices up to the count-limit value provided in the message. The cache device maintains a current-count value that indicates the number of times that the cache device served the object from local storage. When the cache device receives a request message from a requesting device, the cache device compares the current-count value to the count-limit value and only serves the object to the requesting device when the current-count value has not reached the count-limit value.

For example, a cache device could determine that the current-count value is equal to the count-limit value. The cache device could respond to this determination by transmitting a revalidation request message to the origin server in order to revalidate the object that is stored in the local storage. Upon receiving a response message from the origin server specifying a new count-limit value (e.g., 50), the cache device could then set the count limit for the object to 50 and reset current-count value back to zero. Based on these cache control values, the cache device can respond to a maximum of 50 additional requests by serving the locally-stored version of the object before attempting to revalidate the object.

Advantageously, the origin server can manage the loads to service endpoints by controlling the number of times that requesting devices are steered to particular endpoints. More specifically, conventional CDNs would require that the origin server receive every request for an object in order to load balance requests made to service endpoints. By contrast, a distributed network that uses the disclosed techniques frees computing and network resources of the CDN by controlling the number of times a downstream device, such as an edge cache device, can serve an object steering a requesting device to a specific service endpoint before requiring revalidation. The origin server within the CDN effectively controls traffic to various service endpoints without receiving and directly responding to every request message.

System Overview

FIG. 1 illustrates a network infrastructure 100 that is configured to implement one or more aspects of the present disclosure. As shown, network infrastructure 100 includes content provider 110, content delivery network (CDN) 120, gateway 150, and client device 160. CDN 120 includes origin server 122, mid-tier cache device 124, service endpoints 130, and edge cache devices 140. Edge cache device 140(1) includes object 126.

For explanatory purposes, multiple instances of like objects are denoted with reference numbers identifying the object and additional numbers identifying the instance where needed. Further, network infrastructure 100 includes multiple instances of devices, even when not shown. For example, network infrastructure 100 could include multiple content providers 110 (e.g., 110(1), 110(2), etc.), client devices 160 (e.g., 160(1), 160(2), etc.), and/or edge cache devices 140 (e.g., 140(1), 140(2), etc.), and still be within the scope of the disclosed embodiments.

In operation, content provider 110 provides one or more media items to origin server 122. Origin server 122 ingests a given media item and stores the media item as one or more files and/or objects. In various embodiments, one or more service endpoints 130 may store the one or more files and/or objects. When client device 160 requests a media item, a device within the CDN 120 (e.g., origin server 122, mid-tier cache device 124, and/or edge cache device 140(1)) could provide, via edge cache device 140(1), files and/or objects associated with the requested media item. In some embodiments, origin server 122 may steer client device 160 to receive particular files and/or objects from a particular service endpoint (e.g., service endpoint 130(3)) by providing a link (e.g., link 128) to the particular service endpoint 130(3), where service endpoint 130(3) provides one or more files and/or objects associated with the media item to client device 160.

Content provider 110 provides content that one or more client devices 160 can access. For example, content provider 110 could generate one or more media streams as content, where a given media stream includes a plurality of digital content that may include video data, audio data, textual data, graphical data, metadata, and/or other types of data. In some embodiments, content provider 110 may forward one or more media streams to origin server 122 for ingestion. In such instances, origin server 122 may store the digital content in one or more devices within content delivery network (CDN) 120. For example, origin server 122 could store an incoming media stream as a media application (e.g., an episode of a television program) within a content library (not shown) and/or one or more service endpoints 130 (e.g., 130(1), 130(2), 130(3), etc.).

Content delivery network (CDN) 120 distributes content to users (via client devices 160) on behalf of one or more content providers 110. In various embodiments, CDN 120 includes multiple devices that control the efficient delivery of digital content to one or more client devices 160. For example, upon origin server 122 ingesting a media stream as one or more files and/or objects, origin server 122 could cause multiple copies of the files and/or objects to be stored in multiple cache devices 124, 140. When a given object is stored in a given cache device 124, 140, the cache device 124, 140 may respond to a request made by client device 160 associated with the file (e.g., requesting the media stream to which the file is a component) by serving a locally-stored version of the object in lieu forwarding the request to the origin server 122. Such techniques reduce the load placed on origin server 122.

Additionally or alternatively, a cache device, such as edge cache device 140(1), could respond to a received client request by retrieving the asset from the content library and delivering the asset to a client device 160. In such instances, edge cache device 140(1) could respond to subsequent requests for the asset by retrieving a copy of the asset from local storage and delivering the asset to the client device.

In various embodiments, CDN 120 may include multiple tiers of cache devices. As shown, for example, CDN 120 includes two tiers of cache devices, including mid-tier cache devices 124 and edge cache devices 140. Each tier of cache devices may comprise various quantities of specific cache devices. Additionally or alternatively, a given mid-tier cache device 124 is referred to as a parent cache that is upstream of the applicable edge cache device(s) 140. For example, mid-tier cache device 124(1) could be a parent to edge cache devices 140(1), 140(2). There may be any number of cache devices in each tier, and any number of tiers within CDN 120.

Origin server 122 is a computer system configured to serve download requests from client device 160 for particular media. The requested media, such as a particular media application or a media stream, may be stored as digital content files and/or objects that may reside on a mass storage system accessible to origin server 122. The mass storage system may include, without limitation, direct-attached storage, network-attached file storage, or network-attached block-level storage. In various embodiments, origin server 122 stores a first copy of an asset in the mass storage system and acts as an authoritative repository, or primary storage location, for the one or more assets. In various embodiments, the asset stored in the mass storage system acts as a source of truth.

In various embodiments, origin server 122 may configure one or more cache policies associated with an asset when serving the asset to a downstream device. For example, origin server 122 could include a cache policy value that specifies that only an edge cache device 140 (e.g., edge cache device 140) is to store a local copy of object 126 ("only-at-edge"). In such instances, origin server 122 could include the cache policy in a header of a message transmitted to the downstream device.

In some embodiments, origin server 122 may configure the cache policy of a given object in order to manage the traffic within CDN 120. For example, object 126 could be a smart container that includes link 128 that the client device 160 uses to directly connect to a specific service endpoint 130, such as service endpoint 130(3). In such instances, origin server 122 can perform various load management techniques for the set of service endpoints 130 by controlling the number of times the link 128 to a service endpoint 130(3) is provided to requesting devices. In order to monitor the number of times that link 128 has been provided, origin server 122 sets cache control policies for object 126 that limit the number of times that downstream cache devices can serve object 126.

In some embodiments, cache devices 124, 140 may, upon determining that the limit is reached, transmit a revalidation request for object 126 to an upstream device. In such instances, the revalidation request includes the monitored number. In this manner, origin server 122 can track the quantity of times that cache devices 124, 140 serve object 126 without receiving each request originating from the requesting device. In some embodiments, origin server 122 may analyze data associated with the load when configuring the cache control policy. In some embodiments, the data may include load metric data that is reported by service endpoints 130 to origin server 122. Additionally or alternatively, origin server 122 may receive request messages from downstream devices, where the messages indicate a particular service endpoint 130. In such instances, origin server 122 may process the request messages in order to determine load data associated with the particular endpoints.

Cache devices 124, 140 provide cache services for network infrastructure 100 and CDN 120 by storing copies of files and/or objects that can be served to requesting devices. In various embodiments, origin server 122 may cause a given file and/or object to be copied and stored in one or more mid-tier cache devices 124 and/or edge cache devices 140. In such instances, the file may be included as a file in a given file directory, while an object may be included in an object repository. Origin server 122 may cause one or more cache-fill commands to fill the storage of a given cache device 124, 140 with digital content included in the media database. Additionally or alternatively, cache devices 124, 140 may fill the storage of a given cache device 124, 140 on an on-demand basis by responding to resource requests from client devices 160. In some embodiments, cache device 124, 140 may act as a service endpoint 130 and may store one or more files and/or objects associated with a particular service.

In various embodiments, mid-tier cache device 124 and edge cache devices 140 (e.g., 140(1)-140(5)) are geographically distributed throughout the world, or within a given region. In various embodiments, a given edge cache device 140 may be located logically or physically closer to client device 160 than mid-tier cache devices 124 and/or origin server 122. Although FIG. 1 shows CDN 120 having three tiers of origin server 122 and/or cache devices 124, 140, persons skilled in the art will recognize that the architecture of CDN 120 contemplates only an example embodiment. Other embodiments may include additional middle-tier levels of mid-tier cache devices 124, or a single-tier CDN 120. In some embodiments, CDN 120 may be a peer-to-peer network, where no strict hierarchy of cache devices 124, 140 is maintained. Thus, FIG. 1 is in no way intended to limit the scope of the embodiments in any way.

Client device 160 is coupled via gateway 150 and/or one or more networks (not shown) to CDN 120. For example, client device 160 may connect directly to gateway 150, while gateway 150 connects via a public network to CDN 120. In such instances, client device 160 may act as an endpoint that receives a media application originating from content provider 110.

Configurable Access-Based Cache Policy Control

Figure 2:
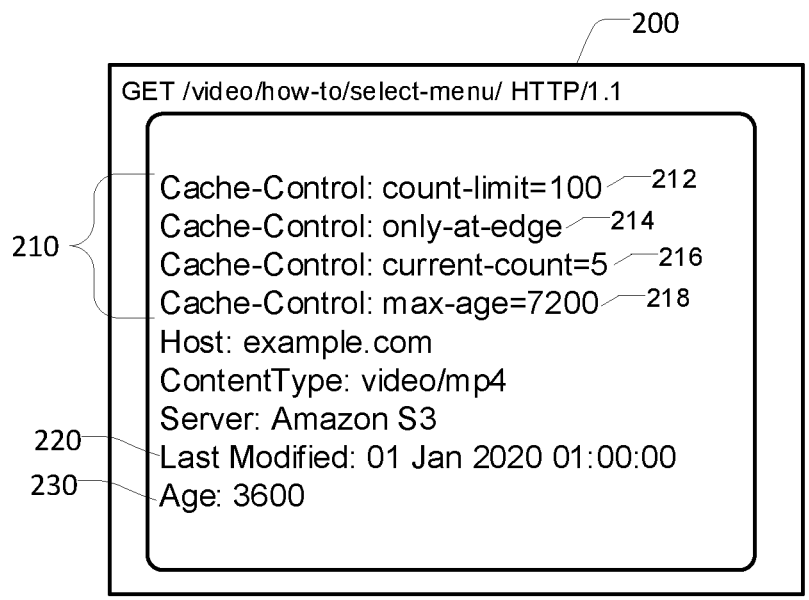
FIG. 2 illustrates an example header associated with a message transmitted to a device in the network infrastructure of FIG. 1, according to various embodiments of the present disclosure.

FIG. 2 illustrates an example header 200 associated with a message transmitted to a device in the network infrastructure 100 of FIG. 1, according to various embodiments of the present disclosure. As shown, header 200 includes cache controls 210, and further controls, including last modified field 220 and age field 230. Cache controls 210 include count-limit field 212, edge caching field 214, current-count field 216, and maximum age field 218.

Header 200 is a portion of a message transmitted by a device. In various embodiments, header 200 may be a portion of a Hypertext Transfer Protocol (HTTP) response message that is generated by an upstream device and transmitted to a downstream device (e.g., mid-tier cache device 124 to edge cache device 140(2)). In such instances, one or more fields could correspond to fields specified in an HTTP specification (e.g., HTTP/3.0). For example, an upstream device could receive, from a downstream device, a request message for a resource, where the downstream device determined that the cache control limit (e.g., expiration, number of times served, etc.) has been reached and requires revalidation or an updated version of the resource. In such instances, the upstream device could transmit a HTTP response message that has a message body including the requested resource (e.g., object 126). As shown, header 200 includes a set of header fields, including cache controls 210, and associated fields, such as last modified field 220 and age field 230. In some embodiments, other fields, such as the last modified field, may be used by cache device 124, 140 to determine whether the resource included in the resource message is more recent or older than a local copy of the resource stored at cache device 124, 140.

Cache controls 210 includes a set of one or more cache control fields that specify cache policies for storing the resource and maintaining the resource in a cache. In various embodiments, any cache devices 124, 140 that are located between client device 160 and origin server 122 that do not recognize cache controls 210 may ignore cache controls 210, yet propagate the response message through CDN 120.

Count-limit field 212 is included in cache controls 210 and provides a download limit that restricts the number of times a given cache device 124, 140 can serve a local copy of an object before requiring revalidation from an upstream device (e.g., mid-tier cache device 124, origin server 122). Current-count field 216 specifies the number of times that the given cache device 124, 140 has served a local copy of the object. In various embodiments, the cache device 124, 140 may compare the current-count value for current-count field 216 with the count-limit value for count-limit field 212 in order to determine whether the cache device 124, 140 has reached the limit.

Edge caching field 214 specifies that the object should only be cached at an edge device. In such instances, intermediate devices will not store a local copy of the object. For example, mid-tier cache device 124 may receive a response message containing object 126 in the body and an edge caching value of "only-at-edge." Due to the presence of the "only-at-edge" edge caching value in header 200, mid-tier cache device 124 could respond by forwarding the response message to edge cache device 140 without storing a local copy of object 126.

Maximum age field 218 specifies an age limit, which specifies the maximum age that the object can reach before expiring. In such instances, the cache device 124, 140 could compare the value for age field 230 with the value for maximum age field 218 in order to determine whether the object has expired. In some embodiments, maximum age field 218 may correspond to a particular field in a specification, such as a "max-age" field in the HTTP 3.0 specification. In various embodiments, the cache device 124, 140 transmits a revalidation request upon determining that the local copy of the object has reached either the download limit or the age limit.

Figure 3:
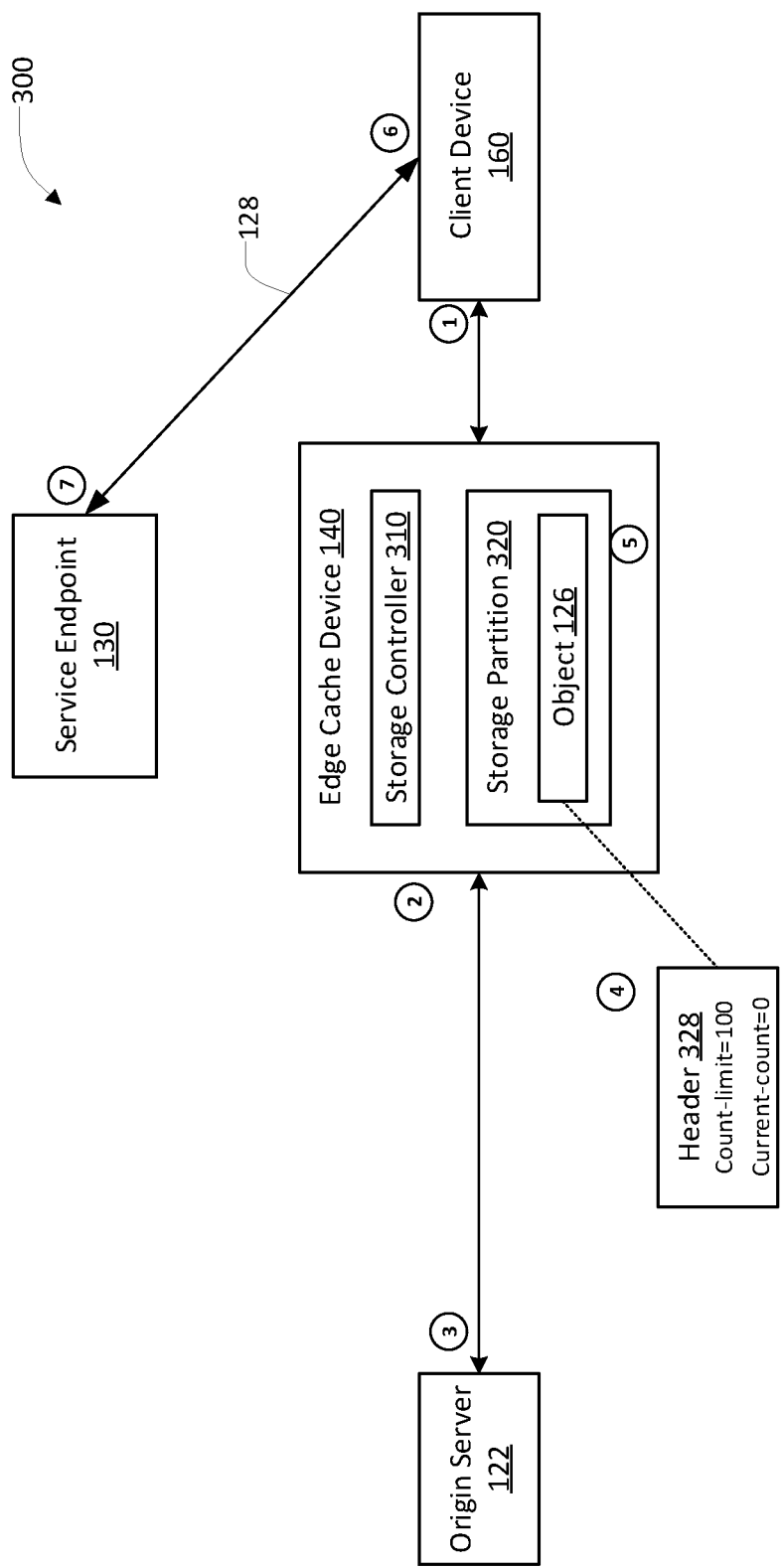
FIG. 3 illustrates a more detailed illustration of a caching technique performed by various devices included in the network infrastructure of FIG. 1, according to various embodiments of the present disclosure.

FIG. 3 illustrates a more-detailed illustration of a caching technique performed by various devices included in the network infrastructure 100 of FIG. 1, according to various embodiments of the present disclosure. As shown, network infrastructure 300 includes origin server 122, edge cache device 140, service endpoint 130, and client device 160. Edge cache device 140 includes storage controller 310 and storage partition 320. Storage partition 320 stores a local copy of object 126.

Storage controller 310 is a component included in a device that manages the contents of storage within the device. For example, storage controller 310 could manage storage partitions (e.g., storage partition 320) within edge cache device 140. In some embodiments, storage controller 310 may communicate with other devices to indicate what files and/or objects storage partition 320 is storing. Additionally or alternatively, storage controller 310, local to a given cache device 124, 140, may manage the transfer of a file and/or object between storage partition 320 and other devices.

In some embodiments, storage controller 310 manages messages associated with serving a given file and/or object to client device 160. For example, edge cache device 140 could receive a request message originating from client device 160, where the request device is associated with streaming a particular video. In such instances, storage controller 310 may identify a particular object that is associated with the request message and determine whether storage partition 320 is storing the particular object. Storage controller 310 could respond with an indication associated with the determination.

In some embodiments, storage controller 310 receives response messages from an upstream device (e.g., origin server 122, mid-tier cache device 124, etc.) associated with the particular object. For example, edge cache device 140 could receive a response message in the form of a revalidation response that revalidates the particular object included in storage partition 320. In such instances, storage controller 310 could process the parameters included in the header of the response message in order to update one or more attributes of the asset that is stored in storage partition 320.

Storage partition 320 is local storage at edge cache device 140. In some embodiments, storage partition 320 may act as a specific type of storage, such as a shared HTTP cache. For example, storage partition 320 could act as an HTTP cache that enables edge cache device 140 to respond to retrieval request messages transmitted by client device 160 by providing a file and/or object associated with the request message.

For explanatory purposes only, a series of numbered bubbles 1-7 depicts an example series of operations that occur when storage controller 310 processes a retrieval request message.

As depicted with the bubble numbered 1, client device 160 transmits a request message. For example, client device 160 could transmit a retrieval request message associated with object 126. As depicted with the bubble numbered 2, edge cache device 140 processes the request message. Edge cache device 140 receives the request message originating from client device 160 and identifies the resource being requested. Storage controller 310 then accesses storage partition 320 to determine whether a copy of the identified resource is stored in storage partition 320. Upon determining that storage partition 320 does not store a valid local copy of the identified resource, edge cache device 140 transmits the request message upstream towards origin server 122.

At the bubble numbered 3, origin server 122 transmits a response message that provides object 126. In some embodiments, an upstream device, such as origin server 122 and/or mid-tier cache device 124, may transmit a subsequent revalidation response message in response to edge cache device 140 transmitting a revalidation request. Each response message includes a header that includes various values for parameters associated with the response message and/or resources associated with the response message.

At the bubble numbered 4, storage controller 310 processes the header from the response message. For example, header 328 could include two cache control values that specify how edge cache device 140 is to store object 126 locally. The count-limit value of 100 specifies a maximum quantity of times that edge cache device 140 is to serve object 126 from storage partition 320 before requesting revalidation. The current-count value is a counter that storage controller 310 maintains to track the quantity of times that edge cache device 140 has served object 126. In various embodiments, storage controller 310 resets the current-count value upon receiving object 126 or a revalidation response for object 126. At the bubble numbered 5, storage controller 310 stores a local copy of the requested resource in storage partition 320.

At the bubble numbered 6, edge cache device 140 serves object 126 to client device 160. In some embodiments, object 126 may be a type of object that includes data that directs client device 160 to retrieve resources from other devices within CDN 120. For example, object 126 could be a smart container that includes link 128, which steers client device 160 to service endpoint 130. At the bubble numbered 7, client device 160 uses link 128 to transmit a subsequent resource request to the specified service endpoint 130.

Figure 4:
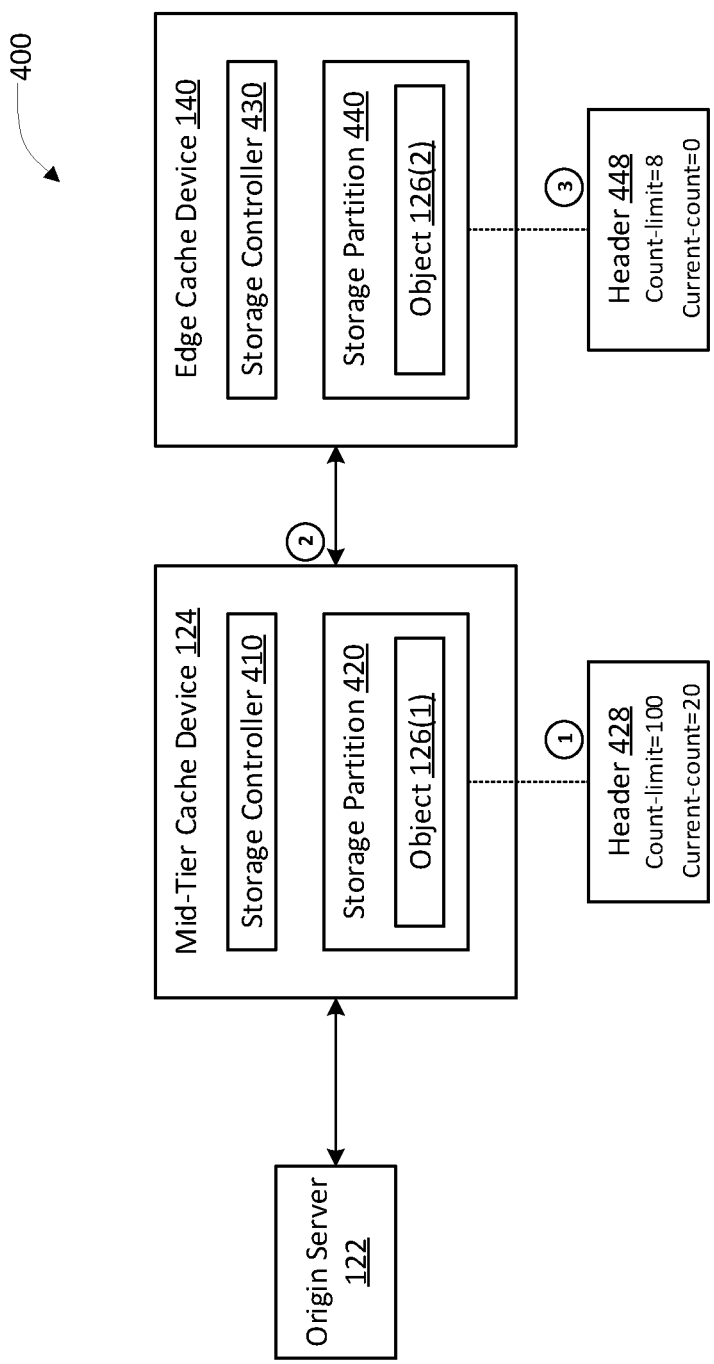
FIG. 4 illustrates a more detailed illustration of another technique performed by various devices included in the network infrastructure of FIG. 1, according to various embodiments of the present disclosure.

FIG. 4 illustrates a more-detailed illustration of another technique performed by various devices included in the network infrastructure 100 of FIG. 1, according to various embodiments of the present disclosure. As shown, network infrastructure 400 includes origin server 122, mid-tier cache device 124, and edge cache device 140. Mid-tier cache device 124 includes storage controller 410 and storage partition 420. Edge cache device 140 includes storage controller 430 and storage partition 440.

In operation, storage controller 410 responds to a request received from edge cache device 140 to revalidate object 126(2), which edge cache device 140 locally stores in storage partition 440. In such instances, storage controller 410 refers to header 428, corresponding to object 126(1), locally stored in mid-tier cache device 124 (in storage partition 420). Based on the values included in header 428, storage controller 410 provides modified values for header 448 such that edge cache device 140 does not exceed the count-limit value specified in header 428.

In the bubble numbered 1, mid-tier cache device 124 responds to a request message received from edge cache device 140. In some embodiments, edge cache device 140 may transmit a request message to load object 126 from mid-tier cache device 124. Additionally or alternatively, edge cache device 140 may transmit a request message that requests revalidation of object 126(2) stored in storage partition 440. Based on the received request message, storage controller 410 refers to header 428, which is associated with object 126(1) that is stored in storage partition 420. The count-limit value of 100 and the current-count limit of 20 indicates that object 126 can be served a maximum of an additional 80 times before requiring revalidation.

In the bubble numbered 2, mid-tier cache device 124 transmits a response message to edge cache device 140. In various embodiments, mid-tier cache device 124 transmits a response message that includes object 126(2) in the message body and header 448. In such instances, mid-tier cache device 124 may provide a different count-limit value in order to require edge cache device 140 to request revalidation more frequently. In some embodiments, storage controller 410 sets the count-limit value included in header 448 as a fractional value of the count-limit value included in header 428.

In the bubble numbered 3, edge cache device 140 stores object 126(2). In various embodiments, storage controller 430 processes header 448 in order to determine how to store object 126(2) in storage partition 440. In some embodiments, storage controller 410 does not increment the current-count value included in header 428 when serving object 126(1) to edge cache device 140. In such instances, the current-count value in header 448 may be incremented upon the edge cache device 140 serving object 126(2) to a client device (e.g., storage controller 410 later updating the current-count value in header 428 from 20 to 28 upon receiving the next revalidation request message indicating that edge cache device 140 had served object 126(2) eight times since the previous reload or revalidation). In some embodiments, storage controller 410 may update the current-count value associated with object 126(1) by the count-limit value specified in a response header that storage controller 410 generates when processing a revalidation request from edge cache device 140. Updating the current-count value in this manner reserves a delivery allocation for edge cache device 140 until a subsequent revalidation request is transmitted.

Figure 5:
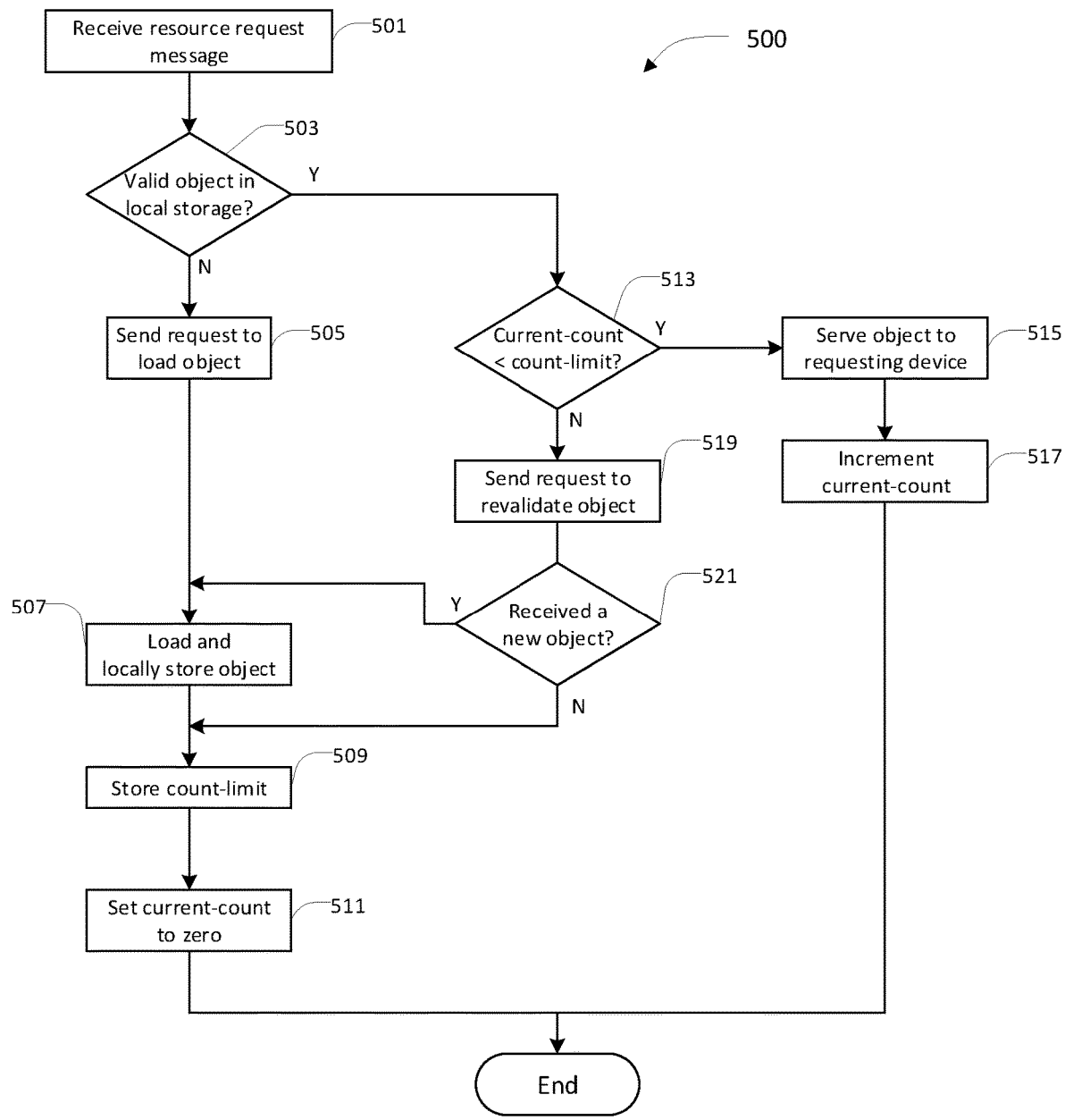
FIG. 5 sets forth a flow diagram of method steps for caching an object or revalidating an object stored in a cache device in the network infrastructure of FIG. 1, according to various embodiments of the present disclosure.

FIG. 5 sets forth a flow diagram of method steps for caching an object or revalidating an object stored in a cache device in the network infrastructure of FIG. 1, according to various embodiments of the present disclosure. Although the method steps are described with reference to the systems of FIGS. 1-4, persons skilled in the art will understand that any system configured to implement the method steps, in any order, falls within the scope of the present invention.

Method 500 begins at step 501, where edge cache device 140 receives a resource request message. In various embodiments, storage controller 310 included in edge cache device 140 receives a resource request message originating from a requesting device (e.g., client device 160). Edge cache device 140 receives the request message originating from client device 160 and identifies an object associated with the requested resource. In some embodiments, a client device 160 may request a media item. In such instances, edge cache device 140 may identify one or more files stored in CDN 120 as resources being requested by client device 160.

At step 503, edge cache device 140 determines whether a valid version of object 126 is included in local storage partition 320. In various embodiments, storage controller 310 accesses storage partition 320 to determine whether a copy of the object associated with the requested resource (e.g., object 126) is stored in storage partition 320. If storage controller 310 identifies the object 126 in storage partition 320, storage controller 310 proceeds to step 513. Otherwise, storage controller 310 determines that storage partition 320 is not storing a valid local copy of the requested resource and proceeds to step 505.

At step 505, edge cache device 140 transmits a request to load the identified object. In various embodiments, edge cache device 140 transmits the request message upstream towards origin server 122. An upstream device (e.g., origin server 122, mid-tier cache device 124) transmits a response message that provides the requested resource (e.g., object 126). The response message includes a header 328 that includes various parameters specifying values associated with the response message, or resources associated with the response message.

At step 507, edge cache device 140 loads and locally stores object 126. In various embodiments, storage controller 310 causes edge cache device 140 to store the requested resource in storage partition 320. At step 509, edge cache device 140 stores the count-limit value. In some embodiments, storage controller 310 processes header 328 from the response message and determines one or more values, including one or more cache control values, to associate with object 126. For example, storage controller 310 could extract the count-limit value from header 328 and associate the extracted count-limit value with object 126 that is stored in storage partition 320.

At step 511, edge cache device 140 sets the current-count value to zero. In various embodiments, storage controller 310 could respond to storing object 126 by resetting the current-count value. Additionally or alternatively, storage controller 310 could respond to a response message (e.g., a revalidation response) by resetting the current-count value, associated with object 126 stored in storage partition 320, from a non-zero value to zero. In such instances, storage controller 310 uses the current-count value to monitor the number of times edge cache device 140 served object 126 since receiving the most-recent revalidation response.

Returning to step 503, upon determining that edge cache device 140 is storing a local copy of the requested resource, edge cache device 140 proceeds to step 513, where edge cache device 140 determines whether an associated current-count value is below an associated count-limit value. In various embodiments, storage controller 310 identifies object 126 retrieves applicable current-count and count-limit values that are associated with object 126. Storage controller 310 determines whether the current-count value is below the count-limit value. When storage controller 310 determines that the current-count value is below the count-limit value, edge cache device 140 proceeds to step 515; otherwise, storage controller 310 determines that the current-count value has reached the count-limit value and proceeds to step 519.

In some embodiments, storage controller 310 may evaluate other attributes of object 126. For example, storage controller 310 could evaluate the age of object 126 stored in storage partition 320 in order to determine whether object 126 is expired. When storage controller 310 determines that all applicable criteria for serving object 126 are satisfied, edge cache device 140 proceeds to step 515; otherwise, storage controller 310 determines that at least one criterion for serving object 126 has not been satisfied and proceeds to step 519.

At step 515, edge cache device 140 serves the locally-stored object 126 to the requesting device. In various embodiments, storage controller 310 causes edge cache device 140 to serve the object 126 to the requesting device. At step 517, edge cache device 140 increments the current-count value associated with object 126. In various embodiments, storage controller 310 increments the current-count value that is associated with object 126 to reflect that edge cache device 140 served at least a portion of object 126 to the requesting device. In other embodiments, storage controller 310 may only increment current-count value upon receiving confirmation that edge cache device 140 transmitted a complete version of object 126 to the requesting device.

Returning to step 513, upon determining that the current-count value for the object has reached the count-limit value, edge cache device 140 proceeds to step 519, where edge cache device 140 transmits a request message to revalidate the locally-stored object. In various embodiments, storage controller 310 responds to the current-count value reaching the count-limit value by causing edge cache device 140 to transmit a revalidation message for object 126 to an upstream device (e.g., mid-tier cache device 124, origin server 122). In some embodiments, the request message includes the current-count value and the count-limit associated with object 126. Additionally or alternatively, the request message includes an entity token that is associated with a particular service endpoint 130 (e.g., service endpoint 130(2)) to which object 126 was steering requesting devices. In such instances, origin server 122 may load balance requests to the service endpoint 130 based on processing the entity token.

At step 521, edge cache device 140 determines whether a new object was received. In various embodiments, edge cache device 140 may receive a revalidation response for object 126. In such instances, storage controller 310 keeps object 126 in storage partition 320. Alternatively, edge cache device 140 may receive a new version of object 126. When edge cache device 140 determines that a new object was received, edge cache device 140 proceeds to step 507, where edge cache device 140 loads the new version of object 126 and stores the new version of object 126 in local storage. Otherwise, edge cache device 140 determines that a new version of object 126 was not received, indicating that a revalidation response was received, and proceeds to step 509, where the count-limit value associated with object 126, as specified in the revalidation response, is stored in storage partition 320.

Figure 6:
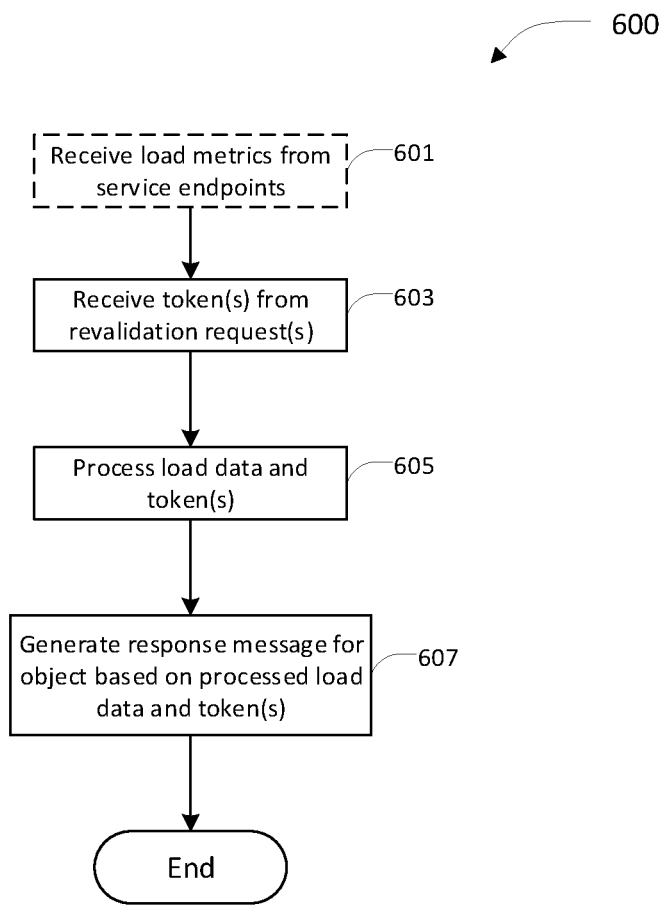
FIG. 6 sets forth a flow diagram of method steps for setting a count limit value for an object to be stored in a cache device in the network infrastructure of FIG. 1, according to various embodiments of the present disclosure.

FIG. 6 sets forth a flow diagram of method steps for setting a count limit value for an object to be stored in a cache device in the network infrastructure of FIG. 1, according to various embodiments of the present disclosure. Although the method steps are described with reference to the systems of FIGS. 1-4, persons skilled in the art will understand that any system configured to implement the method steps, in any order, falls within the scope of the present invention.

Method 600 begins at step 601, where origin server 122 optionally receives load metrics from a set of service endpoints 130. In various embodiments, service endpoints 130 may periodically report load metrics in one or more messages to origin server 122. In some embodiments, service endpoints 130 may directly transmit the load metric data. Additionally or alternatively, service endpoints 130 may transmit load metric data through cache devices 124, 140.

At step 603, origin server 122 receives entity tokens from revalidation requests. In various embodiments, origin server 122 may receive one or more revalidation request messages from one or more downstream devices (e.g., cache devices 124, 140), where the revalidation request messages are associated with particular objects 126. Additionally or alternatively, the revalidation request message may include an entity token that indicates the service endpoint 130 that was provided by origin server 122 in the previous response message for object 126. For example, origin server 122 could transmit a first response message to edge cache device 140(1) that includes object 126, where object 126 includes a link to service endpoint 130(3). Origin server 122 could then receive a revalidation request message from edge cache device 140(1) that includes an entity token identifying service endpoint 130(3).

At step 605, origin server 122 processes the load data and entity tokens. In various embodiments, origin server 122 may process the received tokens and/or the received load metric data. In some embodiments, origin server 122 may process the entity tokens from the received request messages without processing received load metric data. For example, when origin server 122 receives one or more revalidation requests receiving updated load metric data, origin server 122 could process the entity tokens included in the received revalidation requests in order to determine the loads associated with one or more service endpoints 130. Origin server 122 could then perform various load balancing techniques for the one or more service endpoints 130.

At step 607, origin server 122 generates a response message for object 126 based on the processed load metrics. In various embodiments, origin server 122 may generate new cache control values to include in a header 328 of the response message and/or specify a new service endpoint 130 for object 126 (e.g., service endpoint 130(2)) based on the data processed at step 605. For example, origin server 122 could account for the load imposed upon a specific service endpoint 130(3) based on the number of times that the object 126, which provided a link to the service endpoint 130(3), was served by edge cache device 140. Origin server 122 could then specify a different service endpoint 130(2), steering subsequent requesting devices to service endpoint 130(2). Additionally or alternatively, origin server 122 may adjust the count-limit value for object 126 to adjust the maximum number of times that edge cache device 140 serves object 126 before requiring an additional revalidation request.

General Overview

Figure 7:
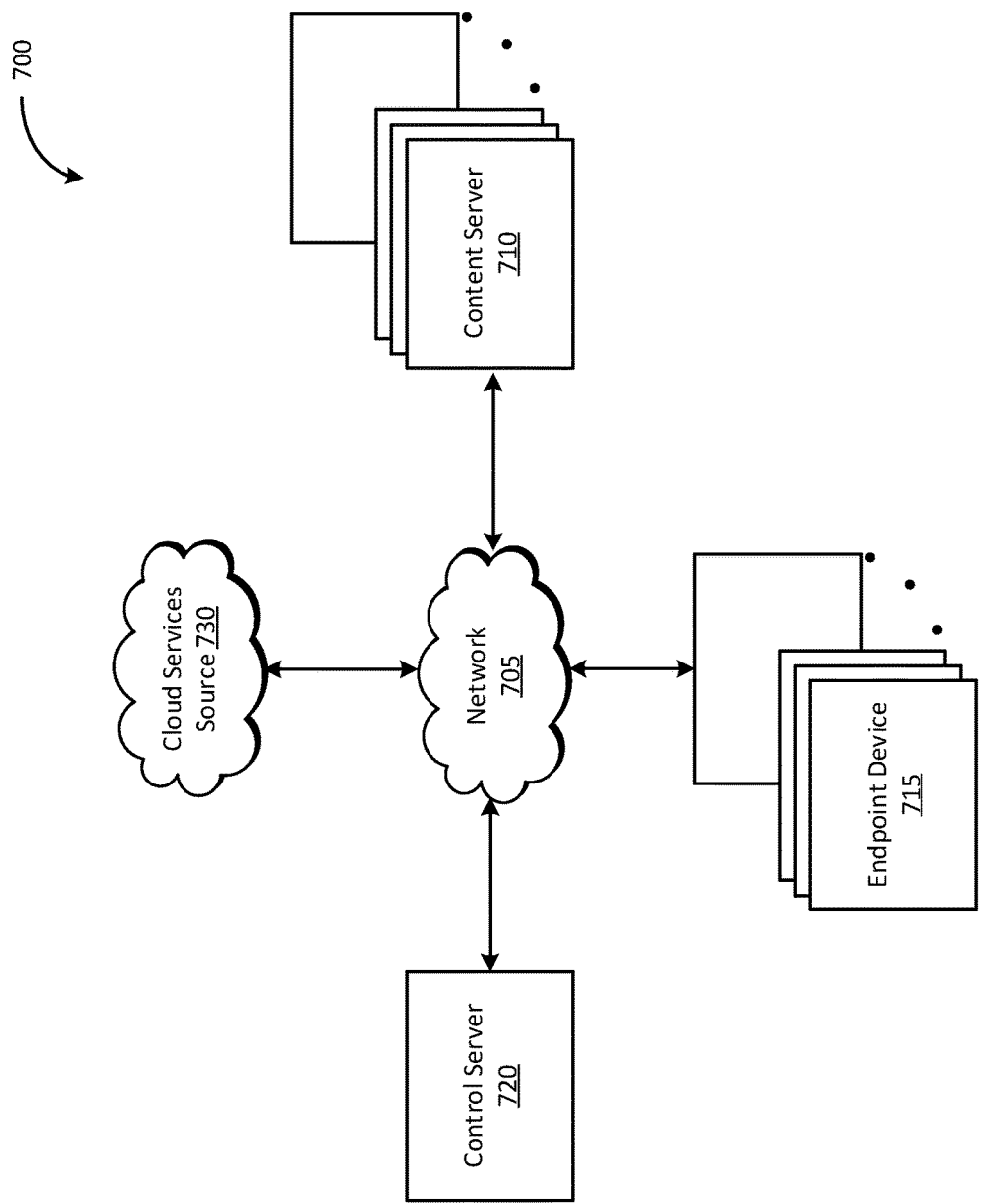
FIG. 7 illustrates another network infrastructure configured to implement one or more aspects of the present disclosure.

FIG. 7 illustrates another network infrastructure 700 configured to implement one or more aspects of the present disclosure. As shown, network infrastructure 700 includes endpoint devices 715, content servers 710, and control server 720, each of which are connected via communications network 705. Network infrastructure 700 is configured to distribute content to content servers 710, and such content is then distributed on demand to endpoint devices 715.

Each endpoint device 715 communicates with one or more content servers 710 (also referred to as "caches" or "nodes") in order to download content, such as textual data, graphical data, audio data, video data, and other types of data. The downloadable content, also referred to herein as a "file," is then presented to a user of one or more endpoint devices 715. In various embodiments, endpoint devices 715 may include computer systems, set-top boxes (STBs), mobile computers, smartphones, tablets, console and handheld video game systems, digital video recorders (DVRs), DVD players, connected digital TVs, dedicated media streaming devices (e.g., the Roku® set-top box), and/or any other technically-feasible computing platform that has network connectivity and is capable of presenting content, such as text, images, audio, and/or video content, to a user.

Each content server 710 includes, without limitation, a storage device that may be a standalone networked attached storage (NAS) system, a storage area-network (SAN), a cluster or "farm" of storage devices, a distributed storage architecture, or any other device suitable for implementing one or more aspects of the present disclosure. Additionally or alternatively, each content server 710 may include, without limitation, a computing device with a storage subsystem that may be a standalone server, a cluster or "farm" of servers, one or more network appliances, or any other device suitable for implementing one or more aspects of the present disclosure. Each content server 710 may include, without limitation, a web server and a database, and may be configured to communicate with the control server 720 to determine the location and availability of various files that are monitored and managed by the control server 720. Each content server 710 may further communicate with cloud services source 730 and one or more other content servers 710 in order to "fill" each content server 710 with copies of various files. In addition, the content servers 710 may respond to requests for files received from the endpoint devices 715. The files may then be distributed from the content server 710 or via a broader content delivery network. In some embodiments, the content servers 710 enable users to authenticate (e.g., using a username and password) in order to access files stored on the content servers 710.

Control server 720 may include, without limitation, a computing device that may be a standalone server, a cluster or "farm" of servers, one or more network appliances, or any other device suitable for implementing one or more aspects of the present disclosure. Although only a single control server 720 is shown in FIG. 7, in various embodiments, multiple control servers 720 (e.g., control server 720(1), 720(2), etc.) may be implemented to monitor and manage files.

In various embodiments, cloud services source 730 may include an online storage service (OSS) (e.g., Amazon® Simple Storage Service, Google® Cloud Storage, etc.) in which a catalog of thousands or millions of files is stored and/or accessed in order to fill content servers 710. Cloud services source 730 also may provide computing and/or other processing services. Although only one cloud services source 730 is shown in FIG. 7, in various embodiments, multiple cloud services sources 730 (e.g., cloud services source 730(1), 730(2), etc.) may be implemented.

Figure 8:
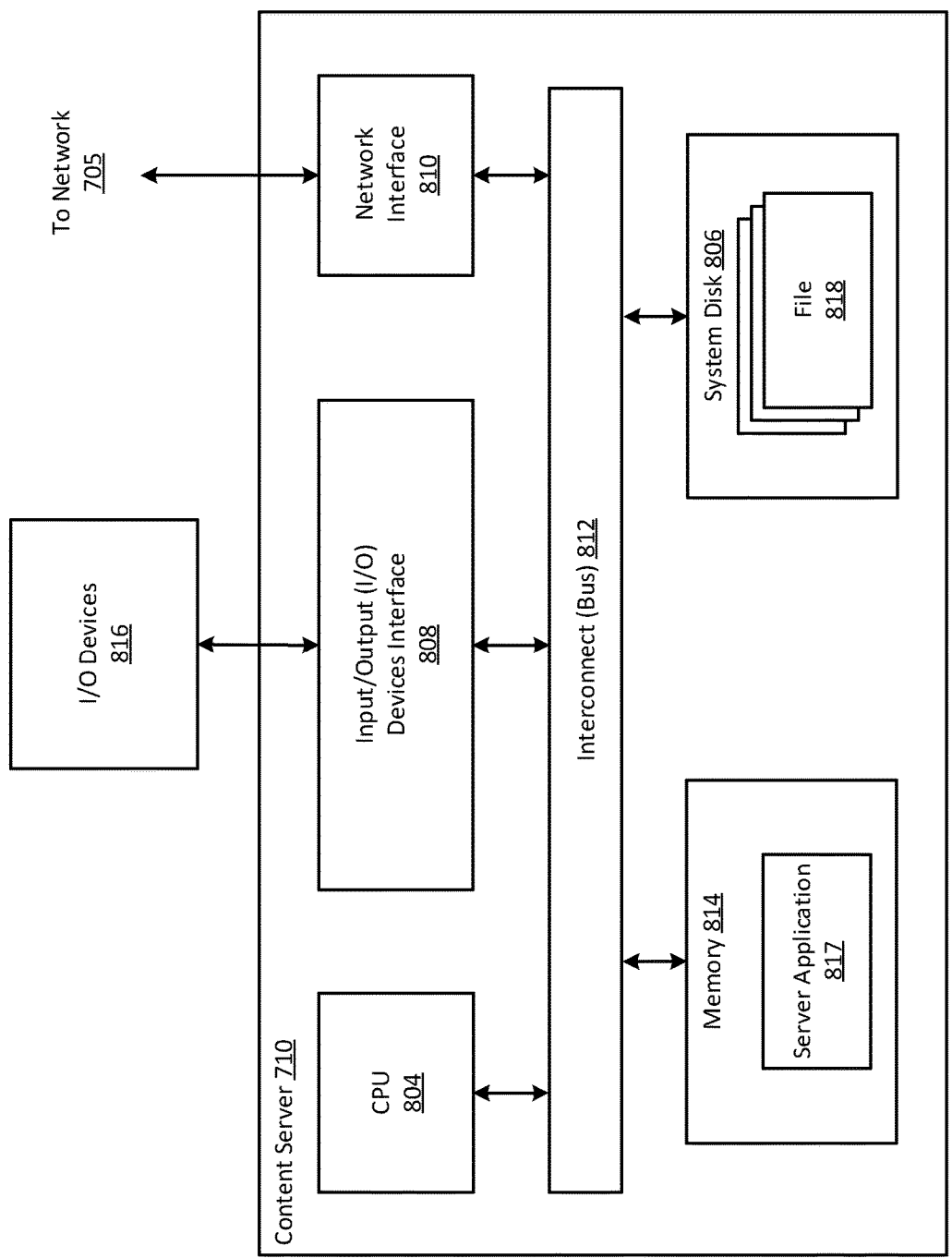
FIG. 8 is a more detailed illustration of the content server included in the network infrastructure of FIG. 7, according to various embodiments of the present disclosure.

FIG. 8 is a more detailed illustration of the content server 710 included in the network infrastructure of FIG. 7, according to various embodiments of the present disclosure. As shown, content server 710 includes, without limitation, central processing unit (CPU) 804, system disk 806, input/output (I/O) devices interface 808, network interface 810, interconnect (bus) 812, and system memory 814.

CPU 804 is configured to retrieve and execute programming instructions, such as server application 817, stored in system memory 814. Similarly, CPU 804 is configured to store application data (e.g., software libraries) and retrieve application data from system memory 814. Interconnect 812 is configured to facilitate transmission of data, such as programming instructions and application data, between CPU 804, system disk 806, I/O device interface 808, network interface 810, and system memory 814. I/O device interface 808 is configured to receive input data from one or more I/O devices 816 and transmit the input data to CPU 804 via interconnect 812. For example, the one or more I/O devices 816 may include one or more buttons, a keyboard, a mouse, and/or other input devices. I/O device interface 808 is further configured to receive output data from CPU 804 via interconnect 812 and transmit the output data to the one or more I/O devices 816.

System disk 806 may include one or more hard disk drives (HDDs), solid-state storage devices (SSDs), and/or similar storage devices. System disk 806 is configured to store nonvolatile data, such as one or more files 818 (e.g., audio files, video files, subtitles, application files, software libraries, etc.). Files 818 can then be retrieved by one or more endpoint devices 715 via network 705. In some embodiments, network interface 810 is configured to operate in compliance with one or more communications standards, such as the Ethernet standard, the Bluetooth standard, and/or one or more wireless communication standards.

System memory 814 includes server application 817, which configures content server 710, to service requests received from endpoint device 715 and other content servers 710. For example, the service request could be for one or more files 818. When server application 817 receives a service request for a specific file, server application 817 retrieves the corresponding file 818 from system disk 806 and transmits file 818 to endpoint device 715 and/or content server 710 via network 705.

File 818 could, for example, be one of a plurality of digital items, such as visual content items like videos and/or still images. Similarly, file 818 could be one of a plurality of textual content items associated with one or more visual content items, such as movie metadata. In various embodiments, file 818 may be a one of a plurality of secure application data items associated with one or more content items and/or applications being executed by content server 710, control server 720, and/or endpoint device 715.

Figure 9:
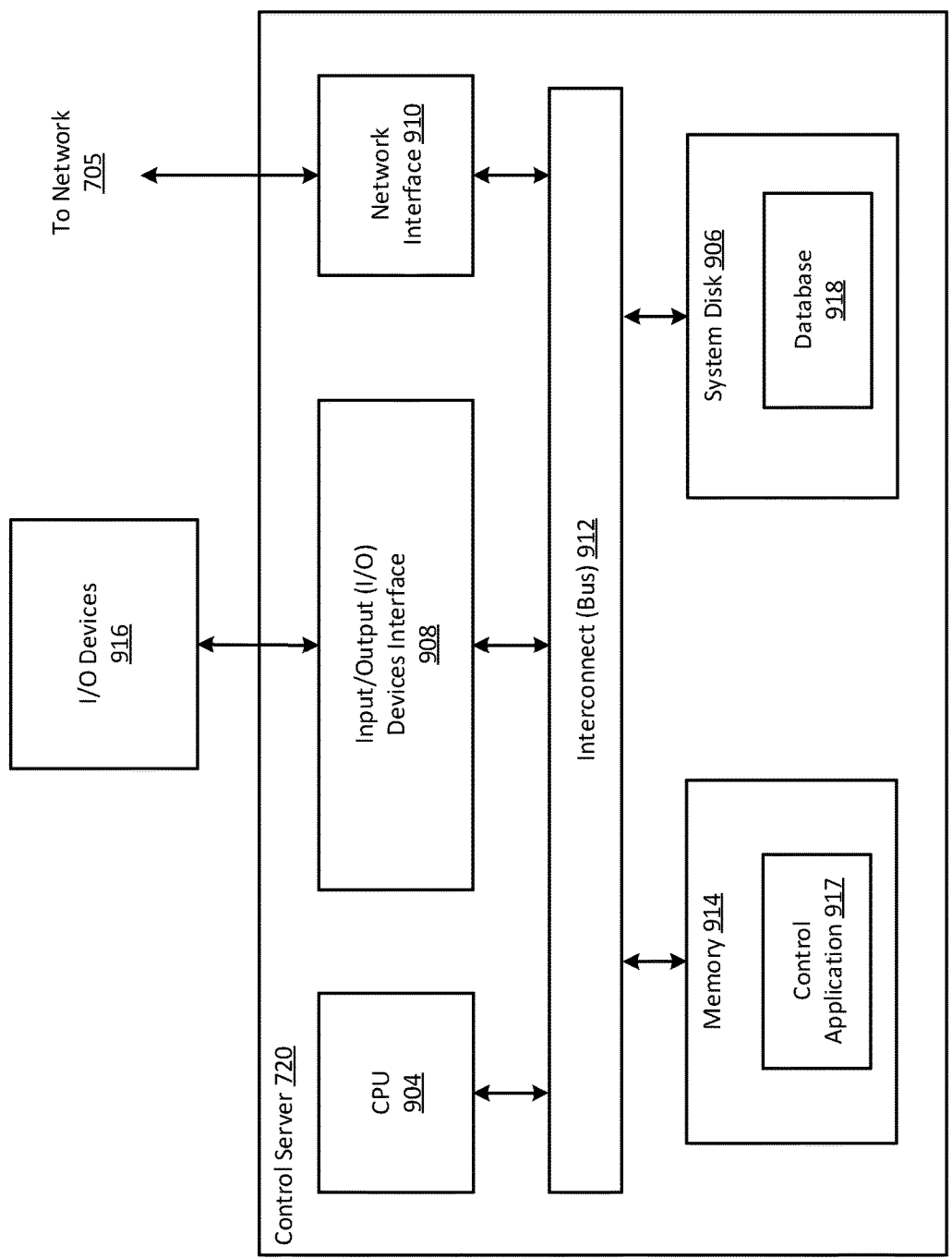
FIG. 9 is a more detailed illustration of the control server included in the network infrastructure of FIG. 7, according to various embodiments of the present disclosure.

FIG. 9 is a more detailed illustration of the control server 720 included in the network infrastructure of FIG. 7, according to various embodiments of the present disclosure. As shown, control server 720 includes, without limitation, CPU 904, system disk 906, I/O devices interface 908, network interface 910, interconnect 912, and system memory 914.

CPU 904 is configured to retrieve and execute programming instructions, such as control application 917, stored in system memory 914. Similarly, CPU 904 is configured to store application data (e.g., software libraries) and retrieve application data from system memory 914 and/or database 918 that is stored in system disk 906. Interconnect 912 is configured to facilitate transmission of data between CPU 904, system disk 906, I/O devices interface 908, network interface 910, and system memory 914. I/O devices interface 908 is configured to transmit input data and output data between the one or more I/O devices 916 and CPU 904 via interconnect 912. In various embodiments, system disk 906 may include one or more hard disk drives, solid state storage devices, etc. In various embodiments, system disk 906 is configured to store database 918 that stores information associated with one or more content servers 710, cloud services source 730, and/or files 818.

System memory 914 includes control application 917 configured to access information stored in database 918 and process the information to determine the manner in which specific files 818 will be replicated across content servers 710 included in network infrastructure 700. Control application 917 may further be configured to receive and analyze performance characteristics associated with one or more content servers 710 and/or endpoint devices 715.

Figure 10:
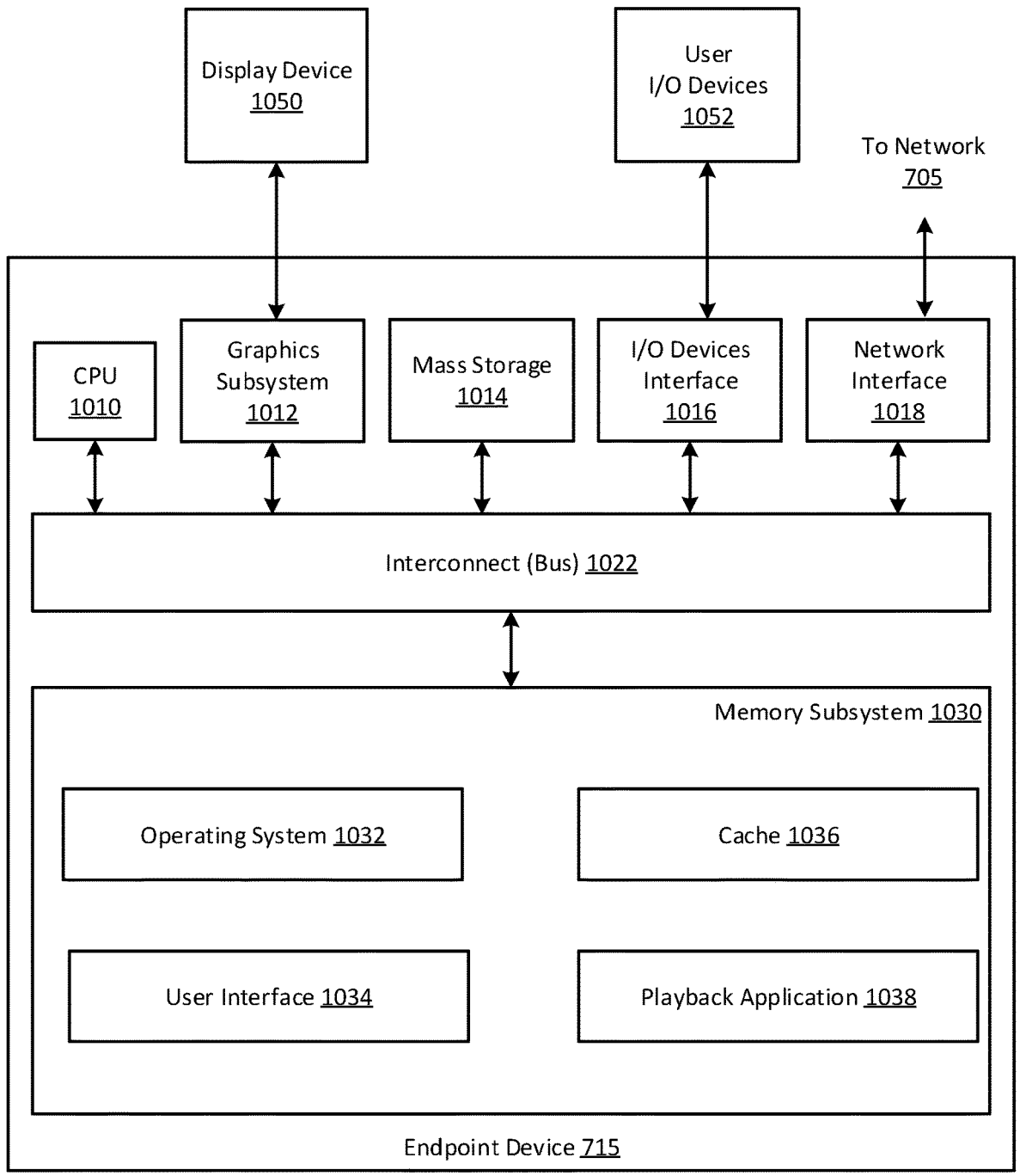
FIG. 10 is a more detailed illustration of the endpoint device included in the network infrastructure of FIG. 7, according to various embodiments of the present disclosure.

FIG. 10 is a more detailed illustration of the endpoint device 715 included in the network infrastructure of FIG. 7, according to various embodiments of the present disclosure. As shown, endpoint device 715 may include, without limitation, CPU 1010, graphics subsystem 1012, mass storage unit 1014, I/O devices interface 1016, network interface 1018, interconnect 1022, and memory subsystem 1030.

In some embodiments, CPU 1010 is configured to retrieve and execute programming instructions stored in memory subsystem 1030. Similarly, CPU 1010 is configured to store and retrieve application data (e.g., software libraries) residing in the memory subsystem 1030. Additionally or alternatively, CPU 1010 is configured to store and retrieve data, including content items and/or application data, from mass storage unit 1014. Interconnect 1022 is configured to facilitate transmission of data, such as programming instructions and application data, between the CPU 1010, graphics subsystem 1012, mass storage unit 1014, I/O devices interface 1016, network interface 1018, and memory subsystem 1030.

Graphics subsystem 1012 is configured to generate frames of video data and transmit the frames of video data to display device 1050. In various embodiments, graphics subsystem 1012 may be integrated, along with CPU 1010, into an integrated circuit (IC). Display device 1050 may comprise any technically-feasible means for generating an image for display. For example, display device 1050 could be fabricated using liquid crystal display (LCD) technology, cathode-ray tube technology, and/or light-emitting diode (LED) display technology.

Mass storage unit 1014 can include, for example, a hard disk drive and/or flash-memory storage drive, and is configured to store nonvolatile data. For example, mass storage unit 1014 could store one or more files 818, such as content items and/or application data. In various embodiments, endpoint device 715 may copy one or more files 818 stored in memory subsystem 1030 (e.g., secure application data) to mass storage unit 1014.

Input/output (I/O) device interface 1016 is configured to receive input data from user one or more I/O devices 1052 and transmit the input data to CPU 1010 via interconnect 1022. For example, user I/O device 1052 may comprise one of more buttons, a keyboard, and a mouse or other pointing device. In various embodiments, I/O device interface 1016 also includes an audio output unit configured to generate an electrical audio output signal. In such instances, user I/O device 1052 may include an audio output device, such as headphones and/or a loudspeaker, configured to generate an acoustic output in response to the electrical audio input signal. Additionally or alternatively, display device 1050 may include the loudspeaker. Examples of suitable devices known in the art that can display video frames and generate an acoustic output include televisions, smartphones, smartwatches, electronic tablets, etc.

Network interface 1018 is configured to transmit and receive packets of data via network 705. In some embodiments, network interface 1018 is configured to communicate using at least one of the Ethernet standard, the Bluetooth standard, and/or one or more wireless communication standards. Network interface 1018 is coupled to CPU 1010 via interconnect 1022.

Memory subsystem 1030 includes programming instructions and application data. In various embodiments, memory subsystem 1030 may include operating system 1032, user interface 1034, playback application 1038, and/or page cache 1036. Operating system 1032 performs system management functions, such as managing hardware devices including graphics subsystem 1012, mass storage unit 1014, I/O device interface 1016, and network interface 1018. Operating system 1032 also provides process and memory management models for user interface 1034, playback application 1038, and page cache 1036. For example, endpoint device 715 may execute operating system 1032 to write data to page cache 1036 and/or sync data included in page cache 1036 to mass storage unit 1014.

User interface (UI) 1034, for example, a graphical user interface (GUI) employing a window-and-object metaphor, provides a mechanism for user interaction with endpoint device 715. Persons skilled in the art will recognize the various operating systems 1032 and/or user interfaces 1034 that are suitable for incorporation into endpoint device 715. Playback application 1038 is configured to request and/or receive content (e.g., one or more files 818) from content server 710 via network interface 1018. Further, playback application 1038 is configured to interpret the content and present the content via display device 1050 and/or user I/O devices 1052.

Page cache 1036 is a portion of volatile memory that stores files 818, such as content items and/or application data (e.g., secure application data, metadata, etc.). In various embodiments, page cache 1036 may correspond to a section of nonvolatile memory. In such instances, endpoint device 715 may sync data initially written into volatile memory by writing the data to the corresponding section of nonvolatile memory. For example, page cache 1036 may correspond to a section of mass storage unit 1014. In such instances, endpoint device 715 then reads and/or writes files 818 to page cache 1036 in lieu of accessing and/or writing files 818 directly in mass storage unit 1014. Endpoint device 715 could then sync data between page cache 1036 and mass storage unit 1014 so that copies of data are stored in both page cache 1036 and mass storage unit 1014.

In sum, a storage controller included in a cache device receives a request for an object stored within a content delivery network. In some embodiments, the object is cached at the cache device; in some embodiments, the cache device loads the object into the cache. The storage controller processes a header for a response message associated with the object to determine whether to service the object to a requesting device. The header includes a set of one or more cache control parameters, including a count limit value specifying the maximum quantity of times that the cache device is to serve the object before requesting revalidation. The header also includes a current count value that indicates the number of times that the cache device has served the object since the most-recent load or revalidation. Upon determining that the current count value is below the count limit, the storage controller causes the cache device to serve the object and increments the current count value. Upon determining that the current count value has reached the count limit, the storage controller causes the cache device to request revalidation for the object. When the cache device subsequently transmits a request message to revalidate the locally-stored object, the request message includes a token that indicates the number of times that the cache device served the locally-stored object since receiving the response message.

In some embodiments, the object may be a smart container that includes a link to a service endpoint within the content delivery network. When the cache device serves the object to the requesting device, the requesting device uses the link to connect to the service endpoint to deliver an asset to the requesting device. In some embodiments, an origin server within the content delivery network may estimate load data based on messages received from cache devices requesting the object or revalidation of the object. In such instances, the message indicates the number of times the cache device has served the object, and thus directed devices to a particular service endpoint, since the most-recent load or revalidation. The origin server processes such data to set the count limit to include in a subsequent header associated with the object.

At least one technological advantage of the disclosed techniques relative to the prior art is that the content delivery network can effectively cache objects at edge devices that remain valid. In particular, by limiting the number of times that a given object can be served from the cache before requiring revalidation, the origin server can ensure that an object remains valid and current without limiting an expiration policy associated with the object. Further, by controlling how cache devices serve cached smart containers, the origin server can effectively load balance requests that the smart containers steer to specific service endpoints without receiving every request for a given object. Further, by dynamically modifying the count limit associated with revalidations, the content delivery network can easily configure the frequency that a cache device revalidates a given object based on multiple factors, including the volume of use, as well as the frequency that the object is served to requestors.

1. In various embodiments, a computer-implemented method comprising receiving a header associated with an object, where the header includes a limit value that specifies a quantity of times the object is to be served from a cache device before revalidation, and a current count value that specifies a number of times that the object has been served since a most-recent revalidation or load, receiving a request for the object from a requesting device, and upon determining that the current count value is below the limit value, serving the object to the requesting device from the cache device, or upon determining that the current count value matches the limit value, transmitting a request for revalidating the object.

2. The computer-implemented method of clause 1, where the header further includes an expiration time specifying the time that the object remains valid at the cache device, and the object is served to the requesting device upon further determining that, based on the expiration time, the object is valid, or the request is transmitted for revalidating the object when either the expiration time has been reached or the current count value matches the limit value.

3. The computer-implemented method of clause 1 or 2, where the object includes information identifying a first service endpoint.

4. The computer-implemented method of any of clauses 1-3, where an origin server sets the limit value based on a load reported by at least the first service endpoint.

5. The computer-implemented method of any of clauses 1-4, where the first service endpoint is included a set of service endpoints, and the origin server sets the limit value based on one or more loads reported by each service endpoint included in the set of service endpoints.

6. The computer-implemented method of any of clauses 1-5, where the limit value is subtracted from a second limit value that is greater than the limit value, and the second limit value is associated with a second cache device that is a parent of the cache device.

7. The computer-implemented method of any of clauses 1-6, where the cache device receives the header from one of (i) an origin server, or (ii) a second cache device that is a parent of the cache device.

8. The computer-implemented method of any of clauses 1-7, further comprising transmitting a second request for the object, wherein the second request includes the current count value.

9. The computer-implemented method of any of clauses 1-8, where the second request comprises a revalidation request.

10. The computer-implemented method of any of clauses 1-9, where the second request includes a revalidation token that identifies a first service endpoint identified by the object when served to the requesting device.

11. In various embodiments, one or more non-transitory computer-readable media stores instructions that, when executed by one or more processors, cause the one or more processors to perform the steps of receiving a header associated with an object, wherein the header includes a limit value that specifies a quantity of times the object is to be served from a cache device before revalidation, and a current count value that specifies a number of times that the object has been served since a most-recent revalidation or load, receiving a request for the object from a requesting device; and upon determining that the current count value is below the limit value, serving the object to the requesting device from the cache device, or upon determining that the current count value matches the limit value, transmitting a request for revalidating the object.

12. The one or more non-transitory computer-readable media of clause 11, where the header further includes an expiration time specifying the time that the object remains valid at the cache device, and the object is served to the requesting device upon further determining that, based on the expiration time, the object is valid, or the request is transmitted for revalidating the object when either the expiration time has been reached or the current count value matches the limit value.

13. The one or more non-transitory computer-readable media of clause 11 or 12, where the header further includes an edge limit that indicates that the object is to be cached only at the cache device when the cache device is at an edge of a network.

14. The one or more non-transitory computer-readable media of any of clauses 11-13, further comprising instructions that, when executed by the one or more processors, cause the one or more processors to perform the steps of determining that the requesting device is a client device, and upon determining that the requesting device is a client device, incrementing the current count value before comparing the current count value to the limit value.

15. The one or more non-transitory computer-readable media of any of clauses 11-14, where the requesting device is a second cache device that is a child of the cache device.

16. The one or more non-transitory computer-readable media of any of clauses 11-15, where the object includes information identifying a first service endpoint included a set of service endpoints, and an origin server sets the limit value based on one or more loads reported by each service endpoint included in the set of service endpoints.

17. In various embodiments, a computing system comprises a memory storing a storage controller application, and a processor that is coupled to the memory and executes the storage controller application by receiving a header associated with an object, wherein the header includes a limit value that specifies a quantity of times the object is to be served from a cache device before revalidation, and a current count value that specifies a number of times that the object has been served since a most-recent revalidation or load, receiving a request for the object from a requesting device, and upon determining that the current count value is below the limit value, serving the object to the requesting device from the cache device, or upon determining that the current count value matches the limit value, transmitting a request for revalidating the object.

18. The computing system of clause 17, where the header further includes an expiration time specifying the time that the object remains valid at the cache device, and the object is served to the requesting device upon further determining that, based on the expiration time, the object is valid, or the request is transmitted for revalidating the object when either the expiration time has been reached or the current count value matches the limit value.

19. The computing system of clause 17 or 18, where the object includes information identifying a first service endpoint included a set of service endpoints, and an origin server sets the limit value based on one or more loads reported by each service endpoint included in the set of service endpoints.

20. The computing system of any of clauses 17-19, where the processor further performs the steps of determining that the requesting device is a client device; and upon determining that the requesting device is a client device, incrementing the current count value before comparing the current count value to the limit value.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for serving and revalidating objects, the method comprising:
   receiving a request for an object from a requesting device;
   determining whether a current count value is less than or equal to a limit value; and
   if the current count value is less than the limit value, then serving the object to the requesting device, or
   if the current count value is equal to the limit value, then transmitting a request to revalidate the object.

2. The computer-implemented method of claim 1, further comprising receiving a header associated with the object, wherein the header includes the current count value and the limit value.

3. The computer-implemented method of claim 1, wherein the limit value specifies a number of times the object is to be served from a cache device prior to revalidation.

4. The computer-implemented method of claim 1, wherein the current count value specifies a number of times the object has been served.

5. The computer-implemented method of claim 4, wherein the number of times the object has been served is counted from a most-recent revalidation operation or load operation involving the object.

6. The computer-implemented method of claim 1, wherein the object is served to the requesting device from a cache device.

7. The computer-implemented method of claim 6, wherein the cache device receives a header from one of an origin server or a second cache device that is a parent of the cache device, and the header includes the current count value and the limit value.

8. The computer-implemented method of claim 1, wherein the object includes information identifying a first service endpoint.

9. The computer-implemented method of claim 8, wherein an origin server sets the limit value based on a load reported by at least the first service endpoint.

10. The computer-implemented method of claim 9, wherein:
    the first service endpoint is included a plurality of service endpoints, and
    the origin server sets the limit value based on one or more loads reported by each service endpoint included in the plurality of service endpoints.

11. One or more non-transitory computer-readable media storing instructions that, when executed by one or more processors, cause the one or more processors to perform the steps of:
    receiving a request for an object from a requesting device;
    determining that a number of times the object has been served from a cache device since a most recent revalidation operation or load operation involving the object is less than a limit value; and
    in response, serving the object to the requesting device from the cache device.

12. The one or more non-transitory computer-readable media of claim 11, further comprising receiving a header associated with the object, wherein the header includes a current count value and the limit value.

13. The one or more non-transitory computer-readable media of claim 12, wherein the limit value specifies a number of times the object is to be served from the cache device prior to revalidation.

14. The one or more non-transitory computer-readable media of claim 12, wherein the current count value specifies a number of times the object has been served.

15. The one or more non-transitory computer-readable media of claim 12, wherein the header further includes a time at which the object becomes invalid at the cache device, and the object is served to the requesting device in response to further determining, based on the time included in the header, that the object is valid.

16. The one or more non-transitory computer-readable media of claim 12, wherein the header further includes an edge limit that indicates that the object is to be cached only at the cache device when the cache device is located at an edge of a network.

17. The one or more non-transitory computer-readable media of claim 11, further comprising:

determining that the requesting device is a client device; and in response, incrementing the number of times the object has been served from the cache before comparing the number of times the object has been served to the limit value.

18. The one or more non-transitory computer-readable media of claim 11, wherein the requesting device comprises a second cache device that is a child of the cache device.

19. The one or more non-transitory computer-readable media of claim 11, wherein:

the object includes information identifying a first service endpoint included a plurality of service endpoints; and an origin server sets the limit value based on one or more loads reported by each service endpoint included in the plurality of service endpoints.

20. A computing system, comprising:

one or more memories storing instructions; and one or more processors that are coupled to the one or more memories and, when executing the instructions, are configured to perform the steps of:

receiving a request for an object from a requesting device;

determining that the object should be served to the requesting device based on a number of times the object has already been served and a limit value;

serving the object to the requesting device.

\* \* \* \* \*

UNITED STATES PATENT AND TRADEMARK OFFICE
CERTIFICATE OF CORRECTION

| | | |
|---|---|---|
| PATENT NO. | : 12,166,840 B2 | Page 1 of 1 |
| APPLICATION NO. | : 18/355364 | |
| DATED | : December 10, 2024 | |
| INVENTOR(S) | : Christopher Newton | |

It is certified that error appears in the above-identified patent and that said Letters Patent is hereby corrected as shown below:

On the Title Page

Delete:
"(30) Foreign Application Priority Data
May 20, 2023 (CN) ............... 202310573393.4".

Signed and Sealed this
Eighteenth Day of March, 2025

Coke Morgan Stewart
*Acting Director of the United States Patent and Trademark Office*